United States Patent
Ikushima

(10) Patent No.: US 7,215,816 B2
(45) Date of Patent: May 8, 2007

(54) PATTERN MATCHING METHOD USING A PYRAMID STRUCTURE SEARCH, IMAGE DETECTING DEVICE, AND COMPUTER-READABLE MEDIUM

(75) Inventor: Yasuhisa Ikushima, Osaka (JP)

(73) Assignee: Keyence Corporation, Osaka (JP)

( * ) Notice: Subject to any disclaimer, the term of this patent is extended or adjusted under 35 U.S.C. 154(b) by 765 days.

(21) Appl. No.: 10/212,350

(22) Filed: Aug. 5, 2002

(65) Prior Publication Data

US 2003/0065654 A1    Apr. 3, 2003

(30) Foreign Application Priority Data

Sep. 28, 2001 (JP) ............ P.2001-299991

(51) Int. Cl.
G06K 9/68  (2006.01)
G06F 3/00  (2006.01)

(52) U.S. Cl. ................... 382/227; 715/700
(58) Field of Classification Search ........ 382/216, 382/227; 715/700
See application file for complete search history.

(56) References Cited

U.S. PATENT DOCUMENTS

| | | | |
|---|---|---|---|
| 4,200,861 A | * | 4/1980 | Hubach et al. ............ 382/216 |
| 4,736,437 A | * | 4/1988 | Sacks et al. ............... 382/216 |
| 6,804,683 B1 | * | 10/2004 | Matsuzaki et al. ........ 707/104.1 |
| 6,922,481 B2 | * | 7/2005 | Masuda et al. ............ 382/141 |
| 6,963,425 B1 | * | 11/2005 | Nair et al. ................. 358/1.9 |
| 2002/0041705 A1 | * | 4/2002 | Lin et al. ................... 382/165 |
| 2002/0051570 A1 | * | 5/2002 | Inagaki ...................... 382/181 |

OTHER PUBLICATIONS

Adelson et al., "Pyramid Methods in image processing", RCA Engineer 29-6, Nov./Dec. 1984.*

* cited by examiner

Primary Examiner—Jingge Wu
Assistant Examiner—Jordan Kuhn
(74) Attorney, Agent, or Firm—Kilyk & Bowersox, P.L.L.C.

(57) ABSTRACT

An image detecting device for executing a pattern matching using a pyramid structure search, comprises an input image storing portion for receiving image data from an external device to hold, a pattern image storing portion for storing a pattern image to be searched, an image processing portion connected to the input image storing portion and the pattern image storing portion, for reading respective image data to execute the pattern matching, a control portion for calculating set parameter candidates that are required to execute the pyramid structure search in the image processing portion, a display portion for displaying groups of set parameter candidates that are calculated in the control portion as a table, and an input portion used to change set parameter values based on the groups of set parameter candidates displayed on the display portion.

18 Claims, 8 Drawing Sheets

FIG. 2

NOSearch

PATTERN REGISTRATION | PARAMETER | DISPLAY

☐ FPSP  8  ☐ HIGH SPEED  ☐ PRECEDING RESULT REFERENCE

TOTAL PRECEDENCE: PROCESS TIME (ms)

| NUMBER | Avg. | Min. | Max. |
|---|---|---|---|
| 0 | 5.00 | 2.95 | 15.26 |
| 1 | 7.00 | 5.55 | 20.27 |
| 2 | 3.50 | 1.95 | 12.28 |
| 3 | 12.00 | 8.50 | 30.29 |
| 4 | 12.80 | 10.95 | 13.30 |

PROCESS TIME

| | DETECTION UNIT | | THRESHOLD VALUE | | INTERPOLATION | | Avg. | Min. | Max. |
|---|---|---|---|---|---|---|---|---|---|
| | REDUCTION RATIO | ANGLE | PIECE NUMBER DETECTION | LOWER LIMIT | POSITION | ANGLE | | | |
| step1 | 16 | 10 | 8 | 60 | ☐ | ☐ | 0.5 | 0.4 | 3.0 |
| step2 | 8 | 10 | 6 | 60 | ☐ | ☐ | 0.4 | 0.3 | 2.7 |
| step3 | 4 | 10 | 6 | 60 | ☐ | ☐ | 0.4 | 0.3 | 2.65 |
| step4 | 2 | 3 | 6 | 60 | ☑ | ☐ | 1.2 | 0.8 | 3.01 |
| step5 | 1 | 1 | 6 | 60 | ☑ | ☑ | 2.5 | 1.15 | 4.2 |

SEARCHED PIECE NUMBER SET  NCNum ▸ = 6

STARTING BASE ANGLE  NCBaseAngle ▸ = 0  DEGREE

DETECTED ANGLE RANGE  NCAngleRange ▸ = 80

EXTRUSION ALLOWED AREA RATE  NCArea ▸ = 20  %

LEARNING ▲ ▾ ↻ ◁

PROCESSED RESULT

DETECTED NUMBER  NCNum ▸ = 6

DETECTED POSITION  NCPos ▸

| NUMBER | X | Y | Ang | Corr |
|---|---|---|---|---|
| 0 | 300.032 | 100.092 | 24.322 | 99.090 |
| 1 | 350.739 | 400.085 | 18.784 | 95.652 |
| 2 | 100.050 | 130.361 | 20.309 | 93.080 |
| 3 | 200.032 | 150.992 | 22.059 | 92.343 |

OK  CANCEL  HELP

FIG. 3

| CANDIDATE | STEP | REDUCTION RATIO | ANGLE WIDTH | PIECE NUMBER | DETECTION THRESHOLD VALUE | LOWER VALUE | POSITION INTERPOLATION | ANGLE INTERPOLATION | PROCESS TIME (ms) AVG | PROCESS TIME (ms) MIN | PROCESS TIME (ms) MAX |
|---|---|---|---|---|---|---|---|---|---|---|---|
| 1 | STEP 1 | 16 | 10 | 3 | 90 | 50 | APPLIED | APPLIED | 3 | 1 | 10 |
|   | STEP 2 | 8  | 5  | 2 | 90 | 60 | APPLIED | APPLIED | 2 | 1 | 12 |
|   | STEP 3 | 4  | 2  | 1 | 98 | 70 | APPLIED | APPLIED | 1 | 1 | 5  |
|   | STEP 4 | 2  | 1  | 1 | 98 | 80 | APPLIED | –       | 1 | 1 | 1  |
|   | STEP 5 | 1  | 1  | 1 | 98 | 80 | APPLIED | –       | 1 | 1 | 1  |
| 2 | STEP 1 | 16 | 5  | 2 | 90 | 50 | APPLIED | APPLIED | 10 | 1 | 20 |
|   | STEP 2 | 8  | 5  | 1 | 90 | 60 | APPLIED | APPLIED | 2  | 1 | 6  |
|   | STEP 3 | 4  | 2  | 1 | 98 | 70 | APPLIED | APPLIED | 1  | 1 | 5  |
|   | STEP 4 | 2  | 1  | 1 | 98 | 80 | APPLIED | –       | 1  | 1 | 1  |
|   | STEP 5 | 1  | 1  | 1 | 98 | 80 | APPLIED | –       | 1  | 1 | 1  |
| 3 | STEP 1 | 8  | 10 | 3 | 90 | 50 | NOT APPLIED | NOT APPLIED | 6 | 1 | 16 |
|   | STEP 2 | 4  | 5  | 2 | 90 | 60 | NOT APPLIED | NOT APPLIED | 4 | 1 | 10 |
|   | STEP 3 | 2  | 2  | 1 | 98 | 70 | NOT APPLIED | –           | 2 | 1 | 5  |
|   | STEP 4 | 1  | 1  | 1 | 98 | 80 | NOT APPLIED | –           | 1 | 1 | 1  |
|   | STEP 5 | –  | –  | – | 98 | –  | –           | –           | – | – | –  |
| 4 | STEP 1 | 8  | 10 | 4 | 90 | 50 | APPLIED     | APPLIED     | 6 | 1 | 20 |
|   | STEP 2 | 4  | 5  | 2 | 90 | 60 | APPLIED     | APPLIED     | 2 | 1 | 12 |
|   | STEP 3 | 2  | 2  | 2 | 98 | 70 | APPLIED     | APPLIED     | 1 | 1 | 5  |
|   | STEP 4 | 1  | 1  | 1 | 98 | 80 | APPLIED     | –           | 1 | 1 | 1  |
|   | STEP 5 | –  | –  | – | 98 | –  | –           | –           | – | – | –  |
| 5 | STEP 1 | 16 | 10 | 4 | 90 | 40 | NOT APPLIED | NOT APPLIED | 3 | 1 | 10 |
|   | STEP 2 | 8  | 10 | 2 | 90 | 60 | NOT APPLIED | NOT APPLIED | 2 | 1 | 12 |
|   | STEP 3 | 4  | 5  | 2 | 98 | 70 | NOT APPLIED | NOT APPLIED | 1 | 1 | 5  |
|   | STEP 4 | 2  | 2  | 1 | 98 | 80 | NOT APPLIED | NOT APPLIED | 1 | 1 | 1  |
|   | STEP 5 | 1  | 1  | 1 | 98 | 80 | –           | –           | 1 | 1 | 1  |

INPUT IMAGE

CORRECTION DEGREE

FIG. 7

[A screenshot of the "NOSearch" pattern registration dialog is shown, with tabs PATTERN REGISTRATION (10), PARAMETER (8), DISPLAY.]

AREA: MEASURED AREA
AREA PROFILE: YEN
REGISTRATION

START COORDINATE X  NCM1PtnX  =  100.0
START COORDINATE Y  NCM1PtnY  =  100.0
WIDTH CX            NCM1PtnCX =  100.0
HEIGHT CY           NCM1PtnCY =  100.0
ANGLE Ang           NCM1PtnAng = 0

BASE POSITION  AUTOMATIC CALCULATION
SX   NCPtnSX  =  100.0
SY   NCPtnSY  =  100.0

LEARNING (15)

SEARCHED PIECE NUMBER SET  NCNum        =  6
STARTING BASE ANGLE        NCBaseAngle  =  0    DEGREE
DETECTED ANGLE RANGE       NCAngleRange =  80
EXTRUSION ALLOWED AREA RATE NCArea      =  20   %

PROCESSED RESULT (13)
DETECTED NUMBER   NCNum  =  6
DETECTED POSITION NCPos

| NUMBER | X | Y | Ang | Corr |
|---|---|---|---|---|
| 0 | 300.032 | 100.092 | 24.322 | 99.090 |
| 1 | 350.739 | 400.085 | 18.784 | 95.652 |
| 2 | 100.050 | 130.361 | 20.309 | 93.080 |
| 3 | 200.032 | 150.992 | 22.059 | 92.343 |

OK   CANCEL   HELP

PATTERN MATCHING METHOD USING A PYRAMID STRUCTURE SEARCH, IMAGE DETECTING DEVICE, AND COMPUTER-READABLE MEDIUM

BACKGROUND OF THE INVENTION

1. Field of the Invention

The present invention relates to the technology that is associated with the image processing utilized in a position detection etc. The present invention relates the technology that is associated with a pattern matching method or a pattern search of searching the predetermined pattern image, which is registered previously, from an input image as search objects while using a pyramid structure search. More particularly, the present invention relates to a pattern matching method of displaying set parameters necessary for a pyramid structure search, an image detecting device for executing the pattern matching, and a computer-readable medium inducing a program for executing the pattern machining.

2. Description of the Related Art

The image processing is utilized in various fields such as the manufacture, the packaging, etc. of electronic parts in the factory. In particular, the pattern matching for searching a predetermined pattern from an image data obtained by an imaging camera etc. is utilized in applications such as the positioning, etc. An example of the pattern matching is shown in FIG. 8. An input image shown in FIG. 8 is constructed by a matrix arrangement in which an area is divided into a plurality of pixels G. As shown in FIG. 8, the pattern matching is applied to the input image area SA1 while moving a previously-registered pattern image RF1 to detect a coordinate at which a detected image OB is to be positioned.

If the practical use is taken into consideration, the higher speed is indispensable to the pattern matching. In this pattern matching, an enormous process time is required if a search for investigating closely the image data as the processed objects in all areas is carried out. Therefore, any means for reducing the process time is needed. In particular, since an approach that is called a pyramid structure search divides the process into plural stages to execute it, such approach is utilized as the approach that can reduce the required process time.

The pyramid structure search is set forth in Japanese Patent Publication (KOKOKU) Hei. 7-37893, for example. In the pyramid structure search, an image serving as the object of the pattern matching method is compressed, then a coarse search processing is applied to the compressed image, and then a coordinate position at which a desired pattern is present is detected. Then, a detailed search processing is carried out around the neighborhood of the detected coordinate to detect the more precise position. In this manner, the rough position is identified according to the coarse search and then the detailed search is carried out in the identified range based on this result. Thus, only the necessary portion can be sequentially investigated closely not to execute the detailed search over the overall image. As a result, the total process time can be reduced.

In the pyramid structure search, the processing speed has the trade-off relation with the processing precision. Normally there is such a tendency that, if the number of search hierarchies is increased, the processing speed can be accelerated but the processing precision is lowered. Thus, the number of hierarchies suitable for the individual image processing must be set. Further, a plurality of parameters required for other operations must also be set. It is difficult to cause the user to set these plural parameters completely. Therefore, if the pattern matching is carried out by using the pyramid structure search in the related art, the required process time is calculated by the computer, or the like on an image detecting device side and also the parameters that are supposed as the optimum are decided automatically.

However, according to this method, the image processing is automatically fixed only by the parameters that are calculated in the device side, and therefore it is impossible to adjust/change respective settings on the user side. In many image detecting devices, a group of parameters that are calculated automatically is decided uniquely and these set contents are fixed. Accordingly, it is impossible to change the set contents on the user side, and thus the margin of setting is not given to the user. The set contents may be displayed to inform the user of such contents, or may be automatically set not to inform the user of the parameter values. In the case where the user is not informed of the information about the parameters, such user cannot confirm the information to achieve the change even if the user tries to change the set contents.

In addition, the values that are automatically calculated in this manner are not always the optimum parameter values that can respond to the user's application situation. Particularly, in the pattern matching method, the calculation of the parameters is carried out based on a predetermined image that is previously registered. For this reason, the optimum parameters are not always calculated so as to respond flexibly to various changes of the image data that are actually input.

Moreover, in the pattern matching, the user wishes to change a part or all of the set contents in response to the case where the reflection factor of the examined object is poor, the generation of noise, the variation in illumination, etc. For example, sometimes the user wishes to adjust the set contents according to the result after the pattern matching is carried out by using the set parameter values. In order to satisfy such request, there is the necessity that a group of calculated parameter candidates should be displayed to the user to permit the change of respective parameters. In addition, if not only a group of parameter candidates is merely displayed but also such an environment can be provided that plural groups of parameter candidates are displayed such that the user can select the optimum set in response to his or her desire, the user can combine the appropriate values mutually, or the like, the pattern matching can be used more conveniently.

SUMMARY OF THE INVENTION

The present invention has been developed in view of such problems to respond to the user's needs. It is an object of the present invention to provide a pattern matching method using a pyramid structure search which informs the user of respective calculated parameter values so that the user can adjust the respective values and carry out desired settings, an image detecting device for executing the pattern matching, and a computer-readable medium inducing a program for executing the pattern machining.

In order to achieve the above object, according to a first aspect of the present invention, there is provided a pattern matching method using a pyramid structure search of searching a predetermined pattern image, which is previously registered, from an input image as a search object by using the pyramid structure search, comprising: calculating a plurality of groups of set parameter candidates to execute the pyramid structure search; and displaying the plurality of groups of set parameter candidates that are calculated.

Also, in the pattern matching method using the pyramid structure search, it is preferable that the displaying step displays the plurality of groups of calculated set parameter candidates as a table format to be compared.

In addition, the pattern matching method using the pyramid structure search, preferably, further comprises: selecting a desired group of parameter candidates from the displayed plurality of groups of set parameter candidates; and changing set parameter values of the selected group of set parameter candidates.

Further, the pattern matching method using the pyramid structure search, preferably, further comprises: calculating indexes indicating features of respective groups of set parameter candidates, wherein the displaying step displays the indexes with the respective groups of set parameter candidates. These indexes can be used as the references when the user decides which set parameter candidate group should be selected.

Furthermore, in the pattern matching method using the pyramid structure search, it is preferable that the indexes are times that are required for predictive processes.

The above object of the present invention also can be achieved by an image detecting device for executing a pattern matching using a pyramid structure search, comprising: an input image storing portion for storing an input image data provided from an external device; a pattern image storing portion for storing a pattern image data to be searched; an image processing portion connected to the input image storing portion and the pattern image storing portion, for reading the input image data and the pattern image data to execute the pattern matching; a control portion for calculating a plurality of groups of set parameter candidates that are required to execute the pyramid structure search by the image processing portion; and a display portion for displaying the plurality of groups of set parameter candidates, which are calculated by the control portion. The image detecting device may further comprise an input portion for changing set parameter values based on the groups of set parameter candidates displayed on the display portion.

Moreover, in order to achieve the above object of the present invention, there is provided a computer-readable medium including a program executable on a computer for executing a pattern matching using a pyramid structure search, the program comprising instructions having: a first function of storing an input image data; a second function of storing a pattern image data to be searched; a third function of reading the input image data and the pattern image data to execute the pattern matching; a fourth function of calculating a plurality of groups of set parameter candidates that are required to execute the pyramid structure search; and a fifth function of displaying the calculated plurality of the groups of set parameter candidates. In the computer-readable medium, it is preferable that the instructions further having: a sixth function of changing set parameter values based on the displayed groups of set parameter candidates.

The magnetic disk, the optical disk, the magneto optical disk, the semiconductor memory, such as CD-ROM, CD-R, CD-RW, the flexible disk, the magnetic tape, MO, DVD-ROM, DVD-RAM, DVD-RW, DVD+RW, etc., and other medium in which the program can be stored are contained in the medium.

BRIEF DESCRIPTION OF THE DRAWINGS

FIG. 2 is an image view showing an example of a user interface constituting a display portion in FIG. 1;

FIG. 3 is a table showing an example of groups of set parameter candidates, which are displayed as a table on the display portion;

FIG. 7 is an image view showing a display in which tabs are switched by the user interface in FIG. 2.

DETAILED DESCRIPTION OF THE INVENTION

Embodiments of the present invention will be explained with reference to the drawings hereinafter. In this case, the embodiments given in the following merely exemplify the pattern matching method using the pyramid structure search to embody the technical concept of the present invention, the image detecting device, and the computer-readable medium. The present invention does not restrict the pattern matching method using the pyramid structure search, the image detecting device, and the computer-readable medium to those described in the following.

The image detecting device in this specification signifies mainly the hardware that can execute the pattern matching method using the pyramid structure search. The hardware has a configuration shown in FIG. 1 and is constructed by the general-purpose or special-purpose parts, circuits, devices, etc. In addition to those, the hardware that can embody the pattern matching method using the pyramid structure search by incorporating the software, the program, the plug-in, the object, the library, the applet, the compiler, or the like into the general-purpose circuit or the computer may be contained in the image detecting device. That is, the embodiment of the present invention can be constructed by virtue of the hardware, or can be achieved by virtue of the software. If the embodiment of the present invention is achieved as the software, the pattern matching method using the pyramid structure search is carried out as the program in the general-purpose or customized dedicated computer, the workstation, the terminal, the mobile electronic device, PDA, the pager, the smart phone, and other electronic devices. An example of the displayed screen of the software that embodies the pattern matching method according to the embodiment of the present invention is shown in FIG. 2. In this case, it is needless to say that the user interface of the program is not limited to this example.

[Image Detecting Device]

Figure 1:
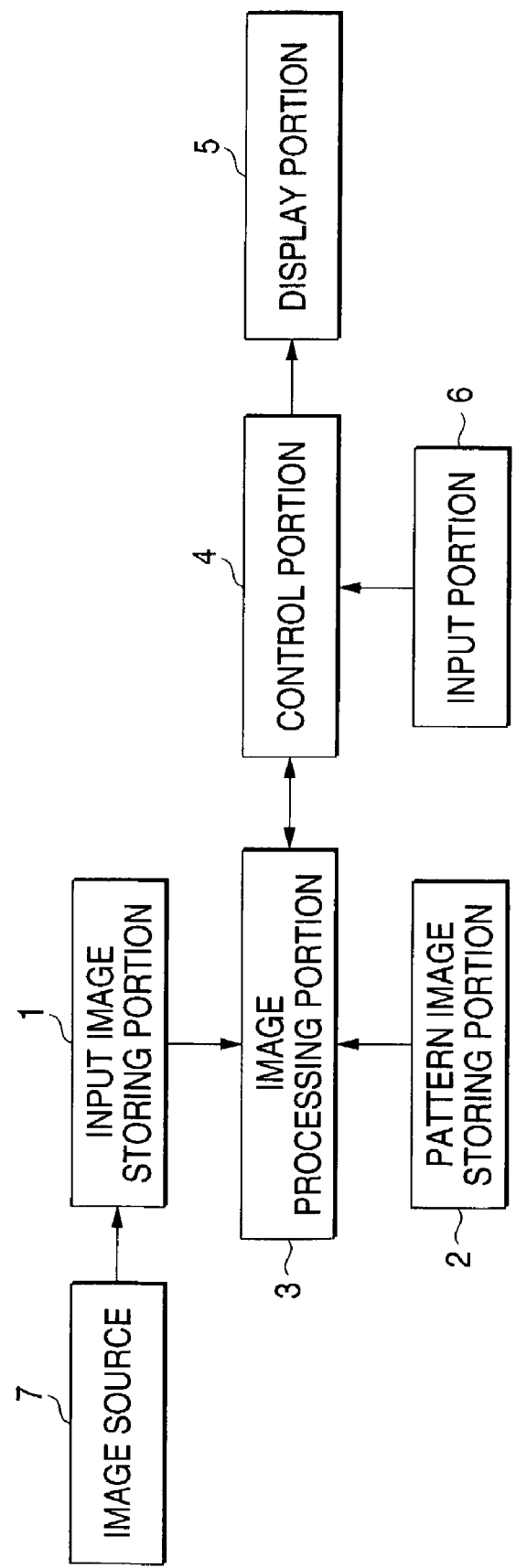
FIG. 1 is a block diagram showing a configuration of an image detecting device according to an embodiment of the present invention.

An embodiment of the present invention will be explained with reference to the image detecting device in FIG. 1 hereunder. The image detecting device shown in FIG. 1 comprises an input image storing portion 1, a pattern image storing portion 2, an image processing portion 3, a control portion 4, a display portion 5, and an input portion 6. The input image storing portion 1 receives an image data from an external device. The pattern image storing portion 2 stores a pattern image to be searched. The image processing portion 3 is connected to the input image storing portion 1 and the pattern image storing portion 2. The image processing portion 3 reads the input image data from the input image storing portion 1 and the pattern image data from the pattern image storing portion 2 respectively to execute various processes. The control portion 4 executes the control that are required to execute the pattern matching in the image processing portion 3 and calculates set parameter candidates necessary for the pyramid structure search. The display portion 5 displays the groups of set parameter candidates that are calculated in the control portion 4. The user can adjust set parameter values into desired set parameters with reference to the group of set parameter candidates displayed on the display portion 5. In this case, mutual relationships between the members and the connection modes are not limited to the example shown in FIG. 1. For example, the image processing portion 3 can be replaced with the control portion 4 mutually, otherwise they may be constructed by a part of the member.

The input image storing portion 1 is connected to an image source 7. The input image storing portion 1 stores an image input data from an image source 7. For example, the real-time images that are picked up by the imaging camera or the reproduced images that are recorded previously are used as the input images, and then such input images are converted into the image data such as the binary data, the multi-tone gray scale data by converting the analog signal into the digital signal by virtue of the A/D converter, for example. As the input image storing portion 1, the memory for storing the input image data, e.g., the RAM as the volatile memory, or the like can be used.

The pattern image storing portion 2 stores an image data to be searched by the pattern matching. Prior to the execution of the pattern matching, a desired pattern image as the criteria in the search is registered in advance. For example, like the input image storing portion 1, the pattern image storing portion 2 is connected to the external image source 7 (for example, the image source 7 can switch the connection between the input image storing portion 1 and the pattern image storing portion 2) to receive the image data containing the pattern image. The user designates the area, which is to be set as the pattern image, from the received image. The designated area is held in the pattern image storing portion 2 as the pattern image. As the pattern image storing portion 2, the nonvolatile ROM, the volatile RAM, or the like can be used.

The image processing portion 3 reads the input image data and the pattern image data from the input image storing portion 1 and the pattern image storing portion 2 respectively, and acts as the working area at which the pattern matching is executed. The control portion 4 connected to the image processing portion 3 designates addresses used to call the image data from the input image storing portion 1 and the pattern image storing portion 2. The control portion 4 is constructed by the CPU or the like, and then the image processing portion 3 reads the necessary image data in compliance with the address designated by the control portion 4 to execute the pattern matching. Further, the control portion 4 calculates set parameter candidates necessary for the execution of the pyramid structure search. Details of the pyramid structure search will be explained later. Various set parameters calculated in accordance with predetermined procedures are held in a memory in the control portion 4. Details of the set parameters in the pyramid structure search will be explained later. A set of set parameters calculated is held in the internal memory as a first group of set parameter candidates. Furthermore, the set parameters that are different from the above set parameters are calculated according to the similar procedures, and then held in the internal memory as a second group of set parameter candidates. Plural groups of set parameter candidates are calculated by repeating this operation hereunder.

Resultant plural groups of set parameter candidates are sent from the control portion 4 to the display portion 5 and then displayed on the outside. As shown in FIG. 2, in the display method, plural groups of set parameter candidates are displayed simultaneously in a table format such that respective indexes can be checked. In addition, if the user selects the desired group of set parameter candidates, the details of respective set parameters that belong to the selected group of set parameter candidates are displayed. The user can input optimum parameter values from the input portion 6, while looking up the group of set parameter candidates that are calculated and displayed on the display portion 5. As the input portion 6, various pointing devices such as the mouse, the keyboard, the slide pad, the tablet, the digitizer, the light pen, the ten-key, the jog dial, the touch pad, the accu-point, etc. can be utilized. For instance, respective set parameters in the group of the set parameter candidates that are selected by the user are input automatically into the input column at the bottom of the screen shown in FIG. 2. The user operates the input portion 6 in this state to move a cursor to the desired parameter column such that calculated values being input by the default are increased/decreased or calculated values are directly input. In this way, while looking up various parameter values that are calculated automatically by the image detecting device and are guessed to be optimum, the user can further adjust finely the parameter values to meet the application situation. The values being input or corrected by the input portion 6 are input into the control portion 4. The control portion 4 updates display contents of the display portion 5 according to the input information.

[Pyramid Structure Search]

Next, the pyramid structure search will be explained hereunder. The pattern matching or the pattern search is the image searching method in which the pattern image to be searched is registered previously and then the input image as the search object area is scanned to search the registered pattern. In the pyramid structure search, at first the image as the search object is set to have the rough resolution and then the area with the high coincidence is found by analyzing schematically the overall image. More particularly, the correlation between the images is checked in the overall area while moving the object area. The perfect coincidence is not set as the coincidence degree, but a predetermined value of the index that indicates the similarity between the images, e.g., a correlation value of 80%, or the like is set as the coincidence degree. Then, the detailed search is carried out by increasing the resolution based on the result. At this time, the full area is not searched, but the area having the high coincidence is searched mainly. Further, the area having the higher coincidence is selected based on this search result, and then more detailed search is carried out. The detailed search is advanced gradually in the hierarchical manner by repeating this operation, and thus finally the search result of the desired pattern image can be obtained.

In the lowermost layer of the pyramid structure, the search object is reduced to $1/2^n$ of the image and then the pattern matching is carried out by the reduced image. In the first layer, the $1/2^{n-1}$ reduced image is formed on the basis of the result of the lowermost layer and then the pattern matching is carried out by such reduced image. The image size of the search object can be reduced smaller by repeating the above operation n times as the order of the hierarchical layer becomes higher. Therefore, the processing speed of the pattern matching can be increased.

In the pattern matching using the pyramid structure, the processing speed and the processing precision are changed depending on the search hierarchy number constituting the pyramid structure. Both the processing speed and the processing precision have the trade-off relation. If the hierarchy number is increased, normally the processing speed is increased but the processing precision is lowered correspondingly. The hierarchy number is decided by the control portion 4 in response to the required processing precision and speed. In this embodiment, the hierarchy number is set to 5. Also, the user may designate the hierarchy number according to the application purpose and the situation. Although the explanation is made while setting the reduction ratio to $1/2^n$ in the above pyramid structure search, it is of course that the reduction ratio is not limited to this ratio. The reduction ratio may be set to 1/3, 1/5, or the like. Further, although the method of applying the reduction the pyramid structure search is disclosed, the pixel thinning approach may be employed in addition to this.

Besides, the approach of calculating the parameter (the reduction ratio, or the like), which is supposed more appropriately, by using the autocorrelation search is known. In order to decide the reduction ratio parameter by using the autocorrelation search, the correlation value is calculated at respective positions while shifting the position of the pattern image, and then the maximum reduction ratio is presumed based on the distribution of the correlation value. The maximum reduction ratio corresponds to the first layer in the pyramid structure. Similarly, the reduction ratio can be calculated in the order of the second layer, the third layer, . . . by using this approach.

Moreover, there is another parameter such that the pixel interpolation should be applied in reduction or not. If the pixel interpolation is applied in reduction, the result with the higher precision can be obtained whereas the processing speed is lowered. Further, still another parameters are needed, e.g., to what detected angle range the search should be applied when the search is executed, or what value should be set as an angle width rotated in the detected angle range, or how many points should be found as the candidates. These parameters are detected by the calculation and displayed as a table.

An example of groups of set parameter candidates, which are displayed as a table, is shown in FIG. 3. As shown in FIG. 3, in the present embodiment, the reduction ratio, the angle width, the searched piece number, the detected threshold value, the lower limit value, the presence of position interpolation, and the presence of angle interpolation are calculated as the parameters. Also, the process time can be displayed as the index indicating the feature of each set candidate group together with these parameters. Their details will be described later.

In FIG. 3, the candidates 1 to 5 have steps (Step) 1 to 5 respectively, and each step corresponds to each hierarchy of the pyramid structure search. These candidates are displayed in a candidate group display column 9 in FIG. 2. In the candidate group display column 9, plural candidate groups are sorted in the order of total precedence decided by the system and then displayed as 0, 1, 2, . . . All groups of candidates can be read by scrolling the window of the candidate group display column 9. Each candidate displayed in the candidate group display column 9 in FIG. 2 in the order of total precedence corresponds to each candidate in FIG. 3. In this case, given values are merely examples, and those vales in FIG. 2 do not always coincide with those values in FIG. 3. Respective process times as well as the total precedence of each candidate group are displayed in the candidate group display column 9. This process time is the value that is calculated by the control portion 4, and an average time (Ave), a minimum time (Min), and a maximum time (Max) of the total process time, which is required for all steps collectively, are calculated and displayed. If any candidate group is selected from the candidate group display column 9, respective set parameters belonging to the selected candidate group are input into a parameter input column 11, that is provided at the bottom of the candidate group display column 9, every step, and then displayed. Also, the process time for each step is displayed simultaneously. In the example in FIG. 2, the candidate group of the total precedence 0 is selected and highlight-displayed in the candidate group display column 9 and also details of the set parameters in the candidate group 0 are displayed in the parameter input column 11. In this situation, the user can apply the change/adjustment to the desired set parameters.

[Reduction Ratio]

The reduction ratio indicates a level at which an amount of data is compressed by thinning the original images. For example, when the reduction ratio is 1/4, 4 original-pixels are expressed on an average by one pixel. When the hierarchy is increased, the precision is increased twice every time such that the reduction ratio is 1/16 in step 1 in FIG. 3, the reduction ratio is 1/8 in step 2, the reduction ratio is 1/4 in step 3, and so on. In the final step, the process is applied to the data whose reduction ratio is 1/1, i.e., the real data that is not subjected to the data compression. In this case, the control portion 4 calculates the incremented level in every step or the initial value. Preferably, if the incremented level is set to 2, $1/2^{n-1}$ is set to the initial value according to the number of steps. For example, as shown in the candidate groups 3, 4 in FIG. 3, in the case of step 4, the initial value of the reduction ratio is given as $1/2^{(4-1)}=1/2^3=1/8$.

[Angular Width]

In addition, in this example, the input image can be scanned while rotating at a predetermined angle width such that, even if the searched object image is present in its rotated state, such image can be detected. As the rotating method, there are the method of rotating the compared object area to scan, the method of rotating the input image to repeat the scanning of the input image every predetermined angle, etc. The object image is rotated by a predetermined angle width every time when the scanning of the object screen is finished, so that the object image is rotated sequentially. For example, when the angle width is 10°, the object image can be rotated by 360° by repeating such rotation 36 times. The rotation range is not always set to 360°, and the object image may be rotated only in a predetermined range such as 180°, 90°, or the like according to the searched object. In the example in FIG. 2, the detected angle range is set to 80°. Also, in the example in FIG. 3, the angle width is set to 10° to rotate over 360° in step 1, and then the angle width is gradually narrowed and finally the scanning is executed every 1°. In this manner, the required process time can be reduced by executing the scanning roughly at first to reduce the scanning area and then executing the scanning in detail.

[Searched Piece Number]

The parameter of the searched piece number is the parameter that indicates how many candidates of the pattern image should be searched from the input image. The process is interrupted at a point of time when the pattern image is searched by the designated searched piece number, and the process goes to the subsequent step. In the initial stage, the false recognition easily occurs because an amount of information is small, and therefore the searched piece number should be set more largely. For example, in the candidate group 1 in FIG. 3, the pattern image is searched by 3 pieces in step 1, the pattern image is searched by 2 pieces in step 2, and the pattern image is searched by 1 piece in subsequent steps. If plural images are detected, the final step gives the number of the to-be-detected image.

[Detection Threshold Value]

The detection threshold value is the parameter that indicates the value at which the pattern image has the high similarity and does not require the search any more. If the correlation values that are calculated at respective positions exceed the set detection threshold value, the process in the step is ended and the process goes to the next step.

[Lower Limit Value]

The lower limit value is the parameter that indicates the limit at which the pattern image has the poor similarity oppositely to the detection threshold value and below which the input image is not treated as the searched object. The pattern image whose calculated correlation degree is less than the lower limit value is excluded from the processed objects.

[Presence/Absence of Position Interpolation]

Figure 6A:
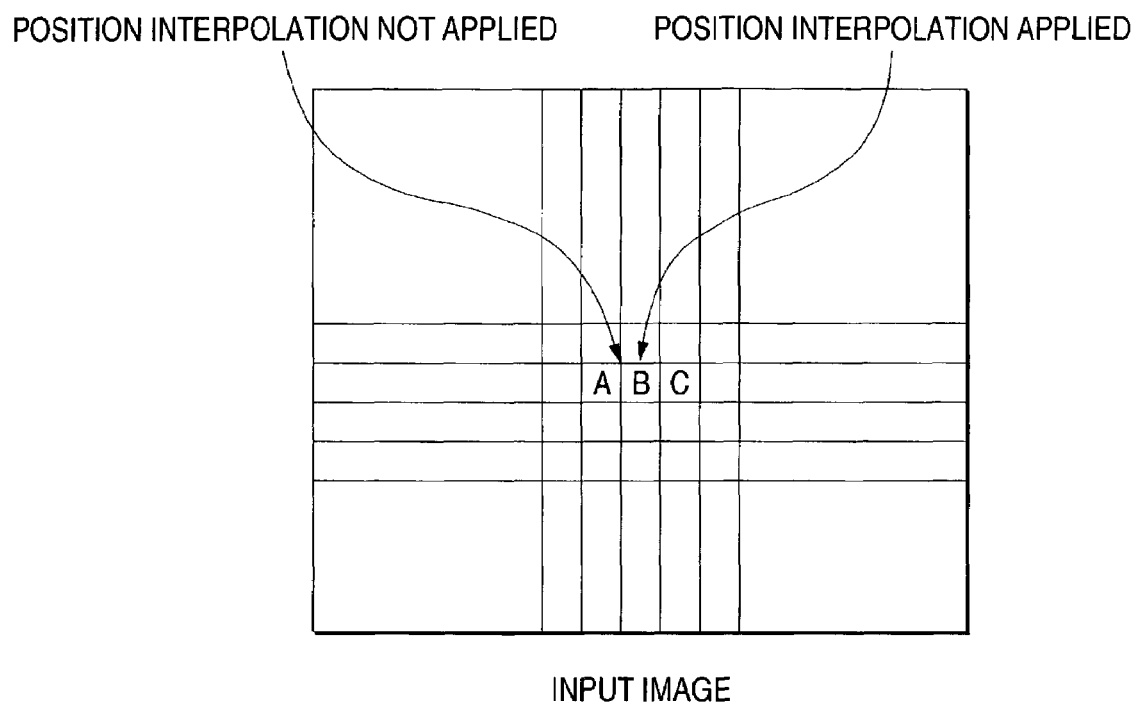
FIGS. 6A and 6B are schematic views explaining a concept of position interpolation.
Figure 6B:
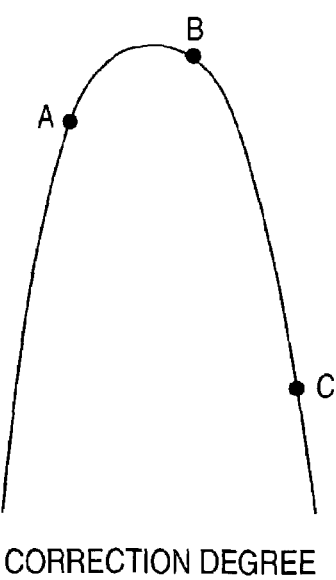
Figure 8:
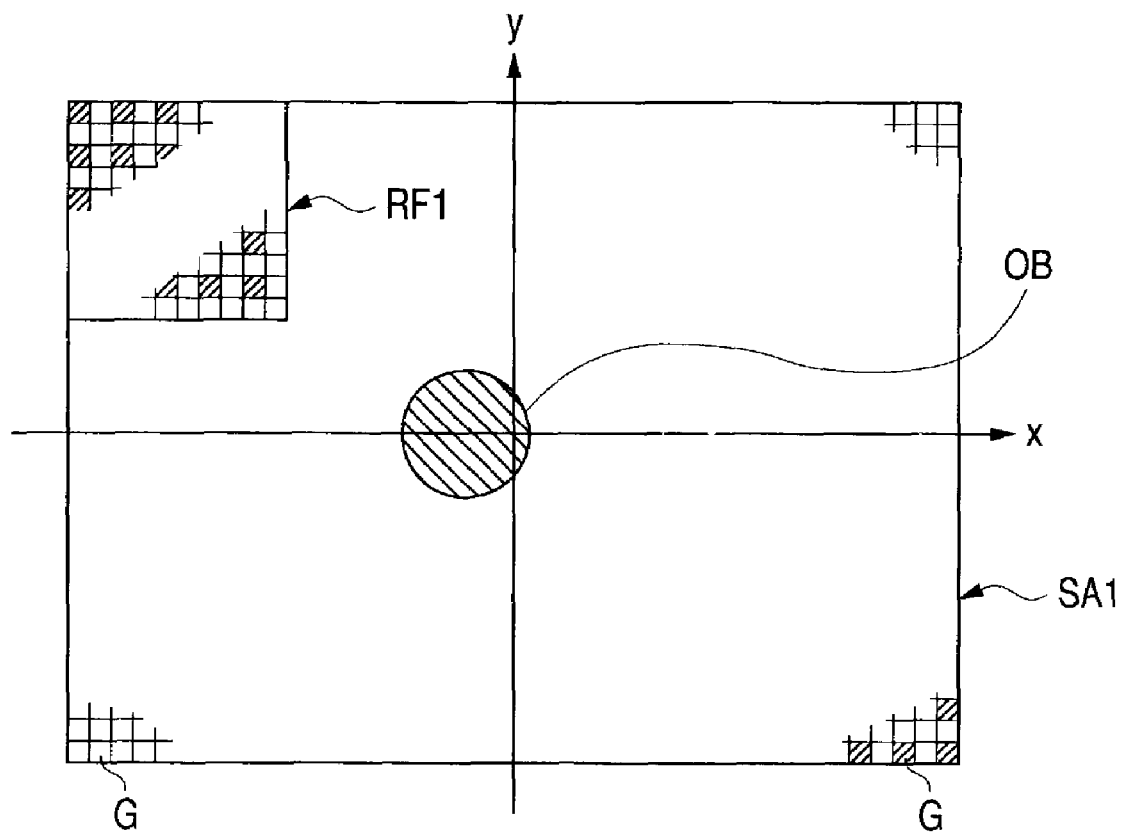
FIG. 8 is a schematic view showing an example of a pattern matching approach.

The position interpolation is the parameter that decides whether or not the position interpolation should be applied. In particular, since the compression degree of the image is set high in the initial step, the error is ready to occur in detection. Therefore, the precision can be enhanced by applying the position interpolation and thus the false detection can be reduced. Here, a concept of the position interpolation will be explained with reference to FIGS. 6A and 6B. Assume that the correlation degrees among the pixels A, B, C that are positioned adjacently as shown in FIG. 6A are given as shown in FIG. 6B, the peak at which the correlation degree is maximum is present between the pixels A and B. However, unless the position interpolation is applied, only the correlation degrees at respective pixels are simply compared with each other. Therefore, the pixel B that has the highest correlation value among the pixels A, B, C is decided as the peak and then the coordinate of the pixel B are recorded. In this case, if the position interpolation is applied, it is presumed from the correlation values, which are calculated at the pixels respectively, where the peak value is positioned. Thus, in the example in FIGS. 6A and 6B, it is decided that the peak value of the correlation degree exists between the pixels A and B. However, if the interpolation is applied, the processes are increased correspondingly and thus the processing speed is lowered. In this case, since the process is applied to the real data in the final step, sub-pixels can be calculated by executing the position interpolation.

[Presence/Absence of Angle Interpolation]

Similarly to the above, the angle interpolation is the parameter that designates whether or not the angle interpolation should be applied when the input image is scanned while rotating the pattern image every predetermined angle width.

[Index of the Set Candidate Group]

In the embodiment of the present invention, in addition to the above parameters, the index indicating the feature of each set candidate group can be displayed together. As the index indicating the feature, for example, the estimated value of the required process time in total, the predictive precision, the predictive maximum error, etc. may be listed. The user can compare/consider the candidate groups listed on the display portion 5 with reference to these indexes can then select the candidate group in view of the optimum balance between the required process time and the processing precision.

In the example in FIG. 3, the estimated value Avg of the average process time, the estimated value Min of the minimum process time, and the estimated value Max of the maximum process time in each step are displayed. The relationship among them is given as $Min \leq Avg \leq Max$. These values can be calculated by the control portion 4.

All details of the parameters, the indexes, the pyramid structure search, the pattern matching approach, etc., as explained above, are merely examples. The feature of the present invention does not reside in the parameter calculating method itself, but the present invention intends to serve the convenience of the user by displaying the calculated parameters. Therefore, the present invention does not identify the procedures of calculating the parameters. As the algorithm or the protocol to calculate the parameters, the already-known one or the future-developed one may be employed.

[Procedures of a Pyramid Structure Search]

Figure 4:
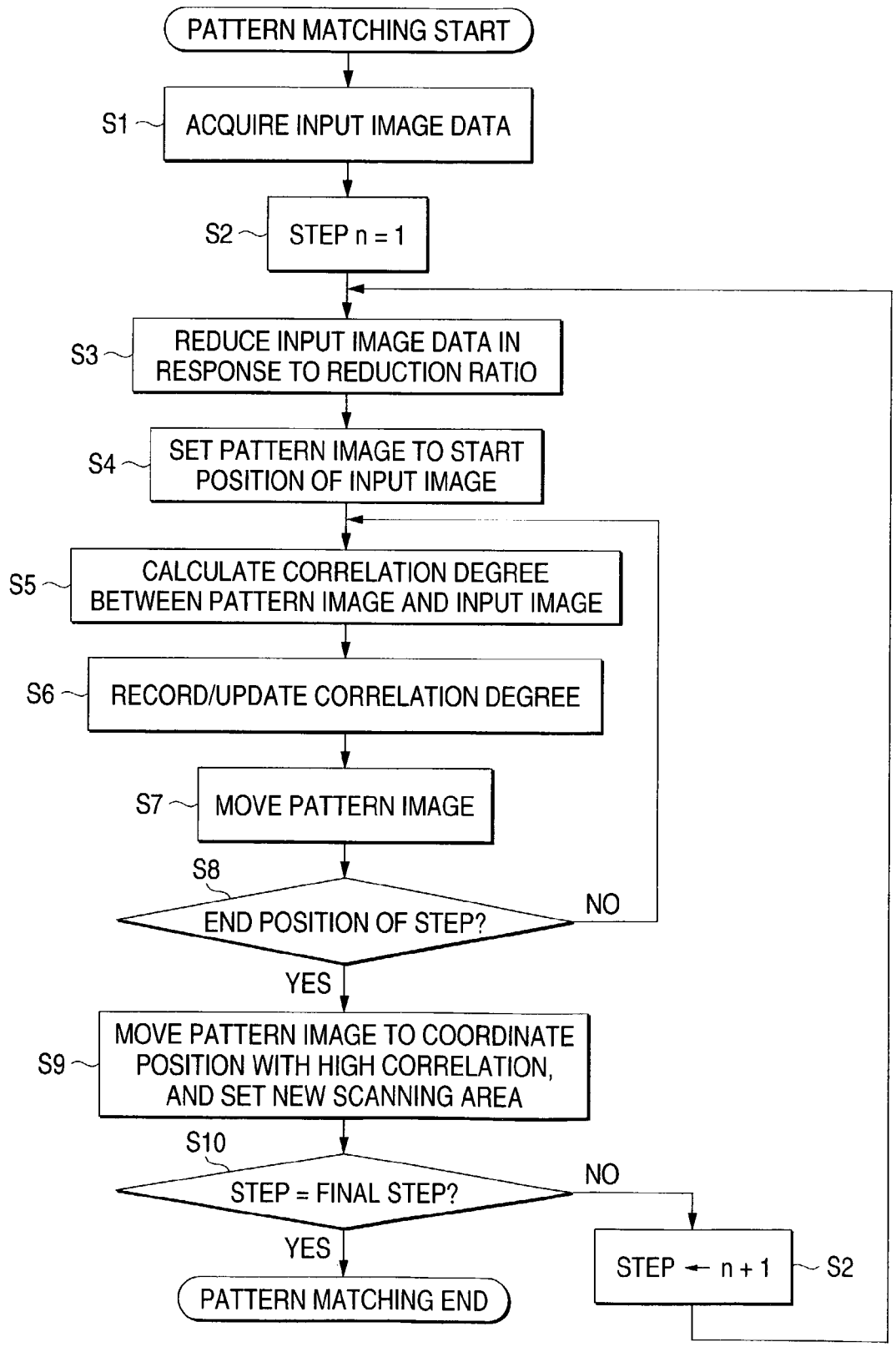
FIG. 4 is a flowchart showing procedures of a pyramid structure search.

The procedures in the pyramid structure search will be explained with reference to a flowchart shown in FIG. 4 hereunder. The pattern image to be detected is registered previously in the image detecting device prior to the execution of the pattern matching.

First, the input image that is acquired by the imaging camera, or the like are converted into the image data by virtue of the binarization, the gray scale, or the like, and then input into the input image storing portion 1 (S1). Then, the step is initialized to set n=1 (S2). The input image data is reduced in response to the reduction ratio, i.e., the coarse data are prepared in the form to thin the input image data (S3). Then, the pattern image is positioned at a start position of the input image (S4). Normally the upper left end of the pattern image is set to the upper left corner of the rectangular input image.

The correlation degree between the pattern image and the input image is calculated at this position (S5). The correlation coefficient is calculated based on a predetermined equation and is set as the correlation degree. Then, the current coordinate and the correlation degree are recorded (S6). If the correlation degree that is calculated sequentially exceeds the recorded correlation degree, these correlation values are updated. In other words, these correlation values are updated so as to hold the maximum value of the correlation degree or the correlation degree of more than the predetermined value and the position on the input image, at which such correlation degree is obtained. The number of the held values is set to the number by which the pattern image should be detected in the hierarchy search.

Then, the pattern image is moved on the input image (S7). An amount of movement is decided according to the reduction ratio. If the reduction ratio is 16, the movement corresponds to the event that the original image is moved by 16 pixels. The pattern image is moved in the X-axis direction, i.e., from the left end to the right end of the input image, then the pattern image is shifted to the next row in the Y-axis direction when the pattern image reaches the right end portion of the input image, and then the pattern image is moved similarly from the left end to the right end. When the pattern image comes up to the lower right corner of the input image as the end position and all area of the input image is scanned, the pattern image is rotated by the predetermined angle width and then the scanning of the pattern image is similarly started from the upper left end as the starting position again. In this manner, since the correlation degree is detected by scanning all area of the input image while rotating the pattern image, the coordinate of the area that has the higher correlation degree and is approximate to the pattern image can be detected. Thus, the scanning is repeated until such scanning reaches the end position of the step, i.e., until the scanning of all input image at the predetermined angle widths is ended (S8).

When the scanning reaches the end position of the step, the coordinate of the area that has the high correlation degree recorded in the step is extracted. Then, the area located in vicinity of the coordinate of the area having the high correlation degree is set as a new scanning area (S9). Then, if the ended step is not the final step, the step number is incremented by 1 and then the process goes to the next step (S10). In this fashion, the area having the high correlation degree is investigated closely by using the reduction ratio and the angle width, both are set more finely at this time. Similarly, the area having the high correlation degree is detected subsequently, and then the coordinate of the area that is approximate to the pattern image is detected finally by executing the detailed search.

[User Interface]

An example of the user interface of the program that embodies the above embodiment is shown in FIG. 2 and FIG. 7 respectively. A display in these figures can be switched by selecting the top tab. FIG. 2 shows the situation that a "parameter" tab 8 is selected, and FIG. 7 shows the situation that a "pattern registration" tab 10 is selected. The display contents located at the lower portion are not changed even when the displayed tab is changed.

["Parameter" Tab]

The parameter candidate groups calculated by the control portion 4 are displayed on the monitor screen constituting the display portion 5. In the "parameter" tab 8 in FIG. 2, the candidate group display column 9 in which a table of the calculated parameter candidate groups is displayed and the parameter input column 11 in which the details of the candidate group selected by the candidate group display column 9 are arranged. In the candidate group display column 9, the candidate groups are displayed in the order that is decided as the optimum by the control portion 4 in light of the processing time and the processing precision, i.e., in the order of the excellent "total precedence" like the number of 0, 1, 2, . . . The process times that are obtained by summing up the process time in each step in total are displayed on the right side of the total precedence in the order of the average, the minimum, and the maximum. The user can look up these values. If the user selects the desired candidate group, details of the set parameters of the selected candidate group are input into the parameter input column 11 at the lower stage and then displayed thereon. The user can change directly numerical values of these parameters, otherwise the user can select the desired value from the predetermined choices. In the example in FIG. 2, the desired value of the reduction ratio is selected from the choices contained in the dialog box that appears when the "▼" button is pushed down. Also, the position interpolation and the angle interpolation are designated by ON/OFF-ing the check box respectively.

["Pattern Registration" Tab]

The registration of the pattern image is carried out by using the "pattern registration" tab 10 shown in FIG. 7. The image received when the pattern image is designated is displayed on a preview display column 14. The user set the area as the pattern image by using the mouse, or the like. Various existing methods can be applied appropriately to register the pattern image. For example, the pattern image having the complicated profile can be designated by extracting the necessary portion from the input image as the measured area, setting the mask area to remove the unnecessary portion, and employing these plural areas in combination. Respective areas can be designated by range-designating the area by means of the mouse, etc., designating the coordinate position, the size, the angle, etc. by means of the numerical value, or designating them in combination. Also, the profile of the area may be shaped into the circle, the ellipse, the semicircle, the triangle, the quadrangular, other polygon, and their combination. In the example in FIG. 7, the circular measured area is designated as the pattern image. A plurality of mask areas can be designated so as to overlap with this measured area. For example, an "area" type designate column is changed from the measured area to the mask area 1, the mask area 2, . . . to set the mask area in detail on the screen in FIG. 2.

An area set column for setting the area is provided on the upper right portion of the screen of the "pattern registration" tab 10, and a reference position set column is provided on the central right portion of the screen. The designated item in the area set column can be changed in response to the profile of the area. For example, the circle can be identified by a coordinate of a center and a radius, whereas the quadrangular can be identified by a coordinate of the reference position such as a vertex, a center of gravity, or the like, a width, a height, an inclination angle, etc.

In addition, in both screens in FIG. 2 and FIG. 7, a reference set column 12 for designating various settings of the pyramid structure search is provided in the lower area. Here, the piece number set (NCNum, etc.) provided on the left side sets the detected piece number, and the starting base angle (NCBaseAngle, etc.) and the detected angle range (NCAngleRange, etc.) detect the state that the searched object and the pattern image are present to have a different angle. The searched object screen is scanned from the starting reference angle while shifting the angle within the detected angle range. In the example in FIG. 2, the screen is scanned around 0° in the range of ±80°. Also, the extrusion allowed area rate (NCArea, etc.) gives the rate indicating to what extend the pattern image should exceed the searched area in the input image in scanning. Also, the learning button is provided on the right side, and the user can calculate plural parameter candidate groups based on the designated pattern image by pushing down this button. The learning button, the application button 15, etc. are provided on the right side, and the pattern matching is executed based on the set parameters. The result of the pattern matching is displayed in a processed result display column 13 provided under them. As the processed result, the detected number (NCNum, etc.) as the detected piece number and respective detected positions (NCPosition, etc.) are displayed. In the example in FIG. 2, the detected number is displayed by the piece number, and the detected position is displayed by respective coordinates of the detected position.

According to the above method, a table of the parameter candidate groups is exhibited to the user. The user can select the candidate group containing the desired parameters from the table based on this table, otherwise the user can designate the parameters in combination or can set uniquely the desired values with reference to the displayed parameters. The selection is executed in the input portion 6. For example, the candidate group can be selected by clicking the input portion 6 by virtue of the mouse connected to the computer, designating the number of the set candidate group via the keyboard, or the like. Also, the user can designate directly the desired value by inputting the numerical value. In this case, the user can designate the upper limit of the number of the displayed candidate groups.

Figure 5:
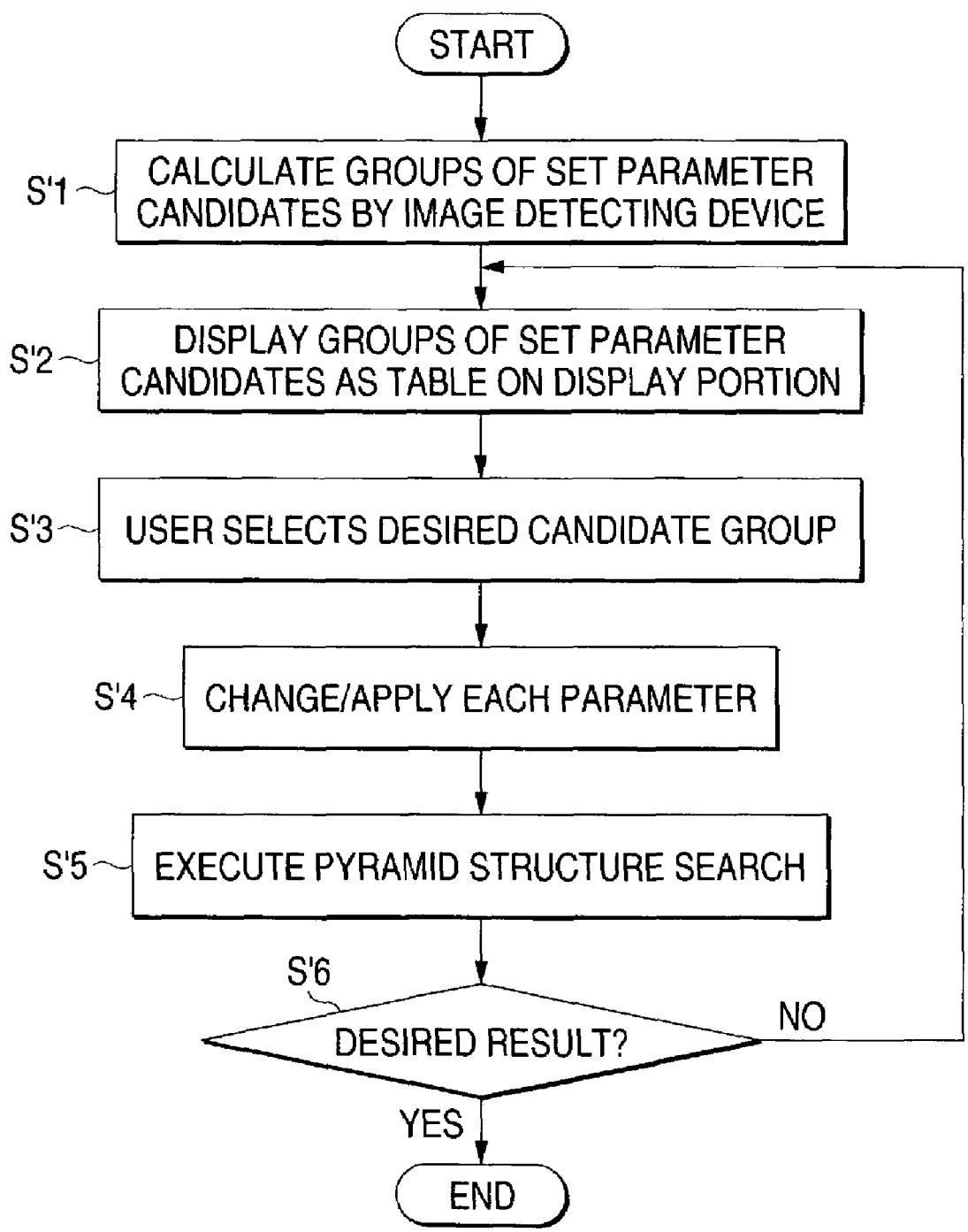
FIG. 5 is a flowchart showing procedures of adjusting the groups of set parameter candidates.

Next, while using the embodiment of the present invention, the procedures of referring/correcting the set parameters by the user will be explained with reference to FIG. 5 hereunder.

The image detecting device calculates groups of set parameter candidates by pushing down the learning button based on the previously-set pattern image, the input image and other information (S'1).

The calculated groups of set parameter candidates are displayed as a table on the learned result column in the display portion 5 (S'2). For the candidate groups, the precedence that is guessed as the optimum is provided based on the predictive processing speed, the processing precision, and other indexes of respective set parameter candidate groups. Then, the set parameter candidates are displayed in the order of the excellent precedence.

The user selects the desired candidate group with reference to the indexes of respective candidate groups (S'3). The detailed parameters belonging to the selected candidate group are displayed on the parameter input column 11.

Further, the user checks particular values of the parameters and then changes the parameters into the desired values if necessary (S'4). If the candidate group that is tuned in this manner is decided, the user pushes down the application button 15 to store the set parameter candidate group that is changed.

Then, the user executes the pyramid structure search (S'5). Then, as the case may be, the user can return to the display of the set parameters while referring to the searched result, etc. (S'6) to refer to or change the set parameter candidate group. Also, the user can adjust finely the set parameters by feeding back the searched result while repeating the trial and error. In this way, the convenience of use can be improved by adjusting the set parameters into the optimum parameter values according to the user's application situation, and also the position detection can be carried out in real time more precisely or at a high speed by the pattern matching method using the pyramid structure search.

As described above, according to the pattern matching method using the pyramid structure search, the image detecting device, and the computer-readable medium of the present invention, the complicated set parameters can be automatically calculated and also can be further adjusted on the user side by displaying the calculated result. Therefore, the user can have the wide margin in decision and can adjust the set parameters into the optimum parameters according to the application situation. In particular, since a plurality of candidate groups that seem to be optimum can be displayed, there is the merit that the user can select the desired values from these candidate groups or can set the desired values with reference to these values and can use the technology of the present invention more conveniently.

What is claimed is:

1. A pattern matching method using a pyramid structure search of searching a predetermined pattern image, which is previously registered, from an input image as a search object by using the pyramid structure search, comprising:
   calculating a plurality of groups of set parameter candidates to execute the pyramid structure search;
   calculating indexes indicating features of respective groups of set parameter candidates;
   displaying the plurality of groups of set parameter candidates that are calculated, wherein said displaying simultaneously displays the indexes with the respective groups of set parameter candidates, and wherein at least one of the plurality of groups of set parameter candidates comprises a reduction ratio; and
   selecting, by a user, one of the plurality of groups of set parameter candidates, to execute the pyramid search.

2. The pattern matching method using the pyramid structure search according to claim 1, wherein said displaying step displays the plurality of groups of calculated set parameter candidates as a table format to be compared.

3. The pattern matching method using the pyramid structure search according to claim 1, further comprising:
   selecting a desired group of parameter candidates from the displayed plurality of groups of set parameter candidates; and
   changing set parameter values of the selected group of set parameter candidates.

4. The pattern matching method using the pyramid structure search according to claim 1, wherein the indexes are times that are required for predictive processes.

5. An image detecting device for executing a pattern matching using a pyramid structure search, comprising:
   an input image storing portion for storing an input image data provided from an external device;
   a pattern image storing portion for storing a pattern image data to be searched;
   an image processing portion connected to the input image storing portion and the pattern image storing portion, for reading the input image data and the pattern image data to execute the pattern matching;
   a control portion for calculating a plurality of groups of set parameter candidates that are required to execute the pyramid structure search by the image processing portion and for calculating indexes indicating features of respective groups of set parameter candidates;
   a display portion for displaying the plurality of groups of set parameter candidates, which are calculated by the control portion, wherein said displaying simultaneously displays the indexes with the respective groups of set parameter candidates, and wherein at least one of the plurality of groups of set parameter candidates comprises a reduction ratio; and
   an input portion for receiving a selection, by a user, of one of the plurality of groups of set parameter candidates, to execute the pyramid search.

6. The image detecting device according to claim 5, further comprising:
   an input portion for changing set parameter values based on the groups of set parameter candidates displayed on the display portion.

7. The image detecting device according to claim 5, wherein said display portion displays calculated groups of set parameter candidates as a table format to be compared.

8. The image detecting device according to claim 5, wherein the indexes are times that are required for predictive processes.

9. A computer-readable medium including a program executable on a computer for executing a pattern matching using a pyramid structure search, said program comprising instructions having:
- a first function of storing an input image data;
- a second function of storing a pattern image data to be searched;
- a third function of reading the input image data arid the pattern image data to execute the pattern matching;
- a fourth function of calculating a plurality of groups of set parameter candidates that are required to execute the pyramid structure search, wherein at least one of the plurality of groups of set parameter candidates comprises a reduction ratio;
- a fifth function of calculating indexes indicating features of respective groups of set parameter candidates;
- a sixth function of displaying the calculated plurality of the groups of set parameter candidates, wherein said displaying simultaneously displays the indexes with the respective groups of set parameter candidates; and
- a seventh function of receiving a selection, by a user, of one of the plurality of groups of set parameter candidates, to execute the pyramid search.

10. The computer-readable medium according to claim 9, wherein said instructions further having:
- an eighth function of changing set parameter values based on the displayed groups of set parameter candidates.

11. The pattern matching method using the pyramid structure search according to claim 1, wherein at least one of the plurality of groups of parameter candidates comprises an angular width for rotating an input image.

12. The pattern matching method using the pyramid structure search according to claim 1, further comprising:
- calculating a correlation value at respective positions of an input image while shifting a position of a predetermined pattern image; and
- deciding the reduction ratio by using the correlation value.

13. A pattern matching method using a pyramid structure search of searching a predetermined pattern image, which is previously registered, from an input image as a search object by using the pyramid structure search, comprising;
- calculating a plurality of groups of set parameter candidates to execute the pyramid structure search;
- calculating indexes indicating features of respective groups of set parameter candidates;
- displaying the plurality of groups of set parameter candidates that are calculated;
- calculating indexes indicating features of respective groups of set parameter candidates,
- wherein said displaying step simultaneously displays the indexes with the respective groups of set parameter candidates;
- selecting, by a user, one of the plurality of groups of set parameter candidates, to execute the pyramid search.

14. The pattern matching method using the pyramid structure search according to claim 13, wherein the indexes are times that are required for predictive processes.

15. The pattern matching method using the pyramid structure search according to claim 1, wherein the indexes comprise a list of precedences determined based on processing time and processing precision displayed in correspondence with respective groups of set parameter candidates.

16. The image detecting device according to claim 5, wherein the indexes comprise, a list of precedences determined based on processing time and processing precision displayed in correspondence with respective groups of set parameter candidates.

17. The computer-readable medium according to claim 9, wherein the indexes comprise a list of precedences determined based on processing time and processing precision displayed in correspondence with respective groups of set parameter candidates.

18. The pattern matching method using the pyramid structure search according to claim 13, wherein the indexes comprise a list of precedences determined based on processing time and processing precision displayed in correspondence with respective groups of set parameter candidates.

* * * * *

UNITED STATES PATENT AND TRADEMARK OFFICE
CERTIFICATE OF CORRECTION

PATENT NO.       : 7,215,816 B2
APPLICATION NO. : 10/212350
DATED            : May 8, 2007
INVENTOR(S)      : Ikushima It is certified that error appears in the above-identified patent and that said Letters Patent is hereby corrected as shown below:

IN THE CLAIMS:

Claim 9, column 15, line 8, "arid" should read --and--.

Claim 13, column 16, lines 9 and 10 delete "calculating indexes indicating features of respective groups of set parameter candidates,"

Claim 13, column 16, line 13, "candidates;" should read --candidates; and--.

Signed and Sealed this

Third Day of July, 2007

JON W. DUDAS
*Director of the United States Patent and Trademark Office*